(12) United States Patent
Lefebvre

(10) Patent No.: US 7,647,520 B2
(45) Date of Patent: Jan. 12, 2010

(54) ELECTRONIC DEVICE FOR GENERATING SYNCHRONIZATION SIGNALS

(75) Inventor: Patrick Lefebvre, Longpont sur Oge (FR)

(73) Assignee: Thales (FR)

( * ) Notice: Subject to any disclaimer, the term of this patent is extended or adjusted under 35 U.S.C. 154(b) by 443 days.

(21) Appl. No.: 11/571,212

(22) PCT Filed: Jun. 17, 2005

(86) PCT No.: PCT/FR2005/052825

§ 371 (c)(1),
(2), (4) Date: Dec. 22, 2006

(87) PCT Pub. No.: WO2005/125010

PCT Pub. Date: Dec. 29, 2005

(65) Prior Publication Data

US 2008/0122508 A1    May 29, 2008

(30) Foreign Application Priority Data

Jun. 22, 2004    (FR) .................................. 04 06780

(51) Int. Cl.
*G06F 1/04* (2006.01)
(52) U.S. Cl. ........................ 713/500; 713/400; 713/600; 327/141
(58) Field of Classification Search ................. 713/400, 713/500, 600; 327/141
See application file for complete search history.

(56) References Cited

U.S. PATENT DOCUMENTS

| RE36,063 E | 1/1999 | Conner et al. |
| 2001/0010003 A1 | 7/2001 | Lai |

FOREIGN PATENT DOCUMENTS

| EP | 0 546 618 | 6/1993 |
| EP | 0 546 618 A | 7/2001 |
| GB | 1 464 387 | 2/1977 |
| GB | 1 464 387 A | 2/1977 |

OTHER PUBLICATIONS

U.S. Appl. No. 11/571,209, filed Dec. 22, 2006, Lefebvre (Not Yet Published).

*Primary Examiner*—Chun Cao
(74) *Attorney, Agent, or Firm*—Lowe Hauptman Ham & Berner, LLP

(57) ABSTRACT

The invention relates to electronic devices for generating synchronization signals, in particular to ultrahigh resolution synchronization signals whose temporal accuracy is less than a nanosecond. The inventive device operates not only with an internal clock but also with the external clock of a synchronizable device, thereby avoiding any temporal drift and uncertainty of the synchronization signals. The main element of the device is embodied in the form of a programmable digital component which operates with the external clock frequency and comprises programmable delay lines enabling to attain ultrahigh temporal resolutions. Said invention also relates to a system comprising several synchronization devices which are interconnected in such a way that the synchronization of different devices remains perfect. The invention makes it possible to control with high accuracy a quasi-unlimited number of devices.

18 Claims, 4 Drawing Sheets

ELECTRONIC DEVICE FOR GENERATING SYNCHRONIZATION SIGNALS

CROSS REFERENCE TO RELATED APPLICATIONS

The present Application is based on International Application No. PCT/EP2005/052825, filed on Jun. 17, 2005 which in turn corresponds to FR Application No. 04 06780 filed on Jun. 22, 2003, and priority is hereby claimed under 35 USC §119 based on these applications. Each of these applications are hereby incorporated by reference in their entirety into the present application.

BACKGROUND OF THE INVENTION

1. Field of the Invention

The field of the invention is that of electronic devices for generating synchronization signals. More specifically, the technical field is that of very high resolution synchronization signals, the temporal accuracy of the signals being less than a nanosecond. These devices are in particular used in the laser subsystems that deliver high-energy, ultra-brief laser pulse trains, the duration of the pulses being of the order of a few hundreds of femtoseconds and their energy being of the order of a terawatt.

These subsystems more often than not comprise a large number of optoelectronic elements needed for generating, amplifying and formatting the laser pulses and elements for controlling, monitoring and measuring these pulses. Now, the pulses emitted have a very brief duration, so it is vitally important to synchronize the various elements of the subsystem with a high temporal accuracy so as to ensure both optimal operation of the subsystem and the best possible reproducibility of the emitted pulses.

2. Description of the Prior Art

The current synchronization devices present a certain number of drawbacks. On the one hand, the internal clock of these various devices is not necessarily perfectly synchronized with an external signal taken from an element of the system to be synchronized. On the other hand, when the system comprises a large number of elements to be synchronized it becomes impossible to synchronize them all with a single synchronization device. In this case, several synchronization devices are used, these devices being synchronized between themselves by so-called trigger devices. These triggers are produced from internal clock signals of the synchronization devices. These clock signals are periodic. It can be demonstrated that the triggering accuracy is equal to one period of the clock signal. For example, for a clock signal emitted at a frequency of 100 megahertz, the synchronization accuracy is then equal to one period, or 10 nanoseconds. This accuracy is not sufficient, for certain applications, to permit a perfect synchronization of the various elements of the system.

SUMMARY OF THE INVENTION

Thus, the invention proposes a device operating no longer with an internal clock but with an external clock taken from the device to be synchronized. Thus, any temporal drift is avoided and the synchronization accuracy of the synchronization signals is increased. It also proposes a system comprising a number of devices of this type interconnected with each other so that the synchronization of the various devices remains perfect. It is thus possible to control with a very high degree of accuracy a virtually unlimited number of appliances. These devices can be driven by a microcomputer, so enabling a rapid, simple and ergonomic implementation by means of software specifically dedicated to this type of application.

More specifically, the subject of the invention is an electronic device for generating synchronization signals from a first external clock signal emitted at a first oscillation frequency, said signal being supplied to a so-called clock input, characterized in that it comprises at least:

first electronic means for formatting the external clock signal so as to obtain a sinusoidal signal of frequency identical to the first oscillation frequency;

second electronic means for generating from said sinusoidal signal:

a first periodic synchronization signal being used as a timebase reference, said signal having a first repetition frequency, said signal being supplied to an electronic so-called reference output.

a plurality of second periodic synchronization signals having second repetition frequencies, said second signals being offset by a programmable time relative to the first synchronization signal, said second signals being supplied to electronic so-called programmed delay signal outputs.

Advantageously, the device also comprises means of generating a second external synchronization clock signal having a frequency identical to the first external clock signal, said signal being supplied to an electronic so-called clock output, the second electronic means include a programmable digital component, in particular of FPGA type, standing for Fast Programmable Gate Array, said programmable digital component controlling a set of delay lines, each of the second synchronization signals being taken from said delay lines.

Advantageously, the first synchronization signal takes the form of a train of identical temporal pulses, each pulse having the form of a crenellation; the second synchronization signals also take the form of trains of identical temporal pulses, each pulse having the form of a crenellation, the rising edge and the falling edge of said crenellation being offset by a first time and a second time programmable relative to the rising edge of the corresponding crenellation of the first synchronization signal.

Furthermore, the programmable digital component includes an electronic memory in which are stored the parameters needed for the electronic device to operate independently, the device also comprises electronic interface means with a microcomputer, said microcomputer making it possible to control and program the functions of the device. It also comprises electronic triggering means making it possible to synchronize certain functions of the device from at least one external signal, said signal being supplied to an electronic so-called "Trigger" input. Finally, the device comprises control means making it possible to deliver control signals for electronic devices or for electromechanical devices or for security systems, said signals being delivered to electronic control outputs.

Advantageously, the first electronic means include an electronic filtering device and a variable gain device, the means of generating the second external synchronization clock signal are essentially an electronic coupler placed at the output of the variable gain device.

Generally, the first oscillation frequency is between 20 megahertz and 100 megahertz, the repetition frequency of the synchronization signals is between 1 hertz and 20 megahertz, the rising and falling edges of the crenellations have a temporal accuracy of 250 picoseconds.

The invention also relates to an electronic system for generating synchronization signals from a first external clock signal emitted at a first oscillation frequency, characterized in that it comprises at least one first and one second electronic devices as defined previously, the first device being controlled from a first external clock signal, the reference output of the first device being linked to the electronic so-called "Trigger" input of the second device by means of a first so-called "Trigger" link and the clock output of the first device being linked to the clock input of the second device by means of a second so-called "Clock" link, each of the other devices being linked to the next device by two "Trigger" or "Clock" type links.

The invention preferably applies to laser subsystems comprising at least the following optoelectronic elements:
a local oscillator emitting an optical beam in the form of laser pulse trains;
an energy amplification subsystem;
means of spatially and temporally formatting the optical beam;
and control, monitoring and measurement means, characterized in that said subsystem comprises at least:
a semi-reflecting optical splitter placed at the output of the local oscillator;
a photodiode placed on one of the channels of said splitter so as to receive a part of the optical beam, said photodiode delivering an electrical signal representative of said optical beam;
and a device or an electronic system for generating synchronization signals as previously described, the electrical signal taken from the photodiode being used as a clock signal for said device or said system, the synchronization signals taken from said device or from said system being used to synchronize the various optoelectronic elements of the subsystem.

Still other advantages of embodiments according to the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

BRIEF DESCRIPTION OF THE DRAWINGS

The invention will be better understood and other advantages will become apparent from reading the description that follows, given by way of nonlimiting example and with reference to the appended figures in which.

MORE DETAILED DESCRIPTION

Figure 1:
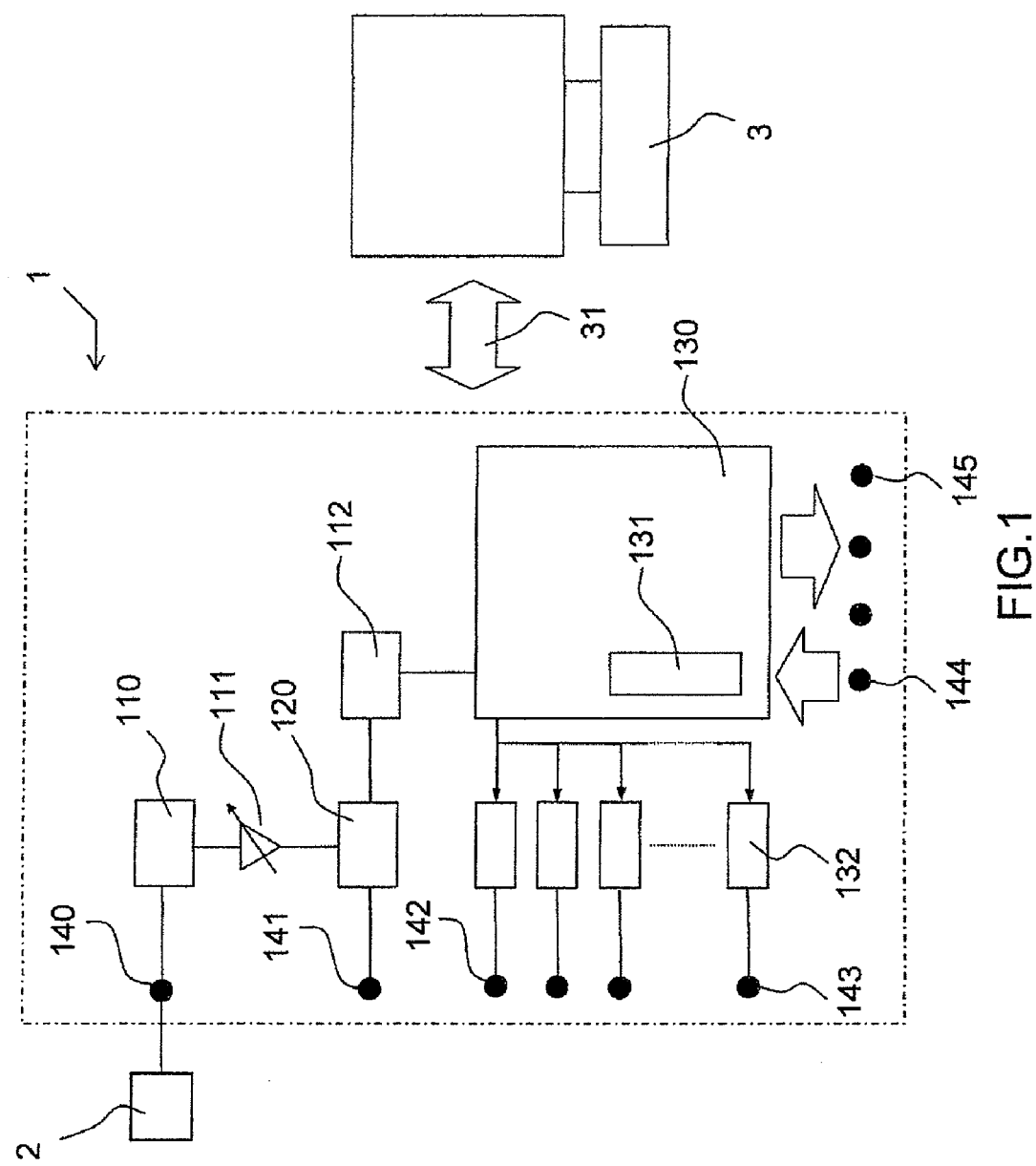
FIG. 1 represents the general block diagram of the device according to the invention.

The present invention is illustrated by way of example, and not by limitation, in the figures of the accompanying drawings, wherein elements having the same reference numeral designations represent like elements throughout and wherein:

As a non-limiting example, FIG. 1 represents an electronic device for generating synchronization signals 1 according to the invention. It mainly comprises:
first electronic means 110, 111 and 112 for formatting an external clock signal so as to obtain a sinusoidal signal of frequency identical to the first oscillation frequency;
second electronic means 130, 131 and 132 for generating from said sinusoidal signal:
a first periodic synchronization signal being used as a timebase reference, said signal having a first repetition frequency, said signal supplied to a so-called reference output 142.
a plurality of second periodic synchronization signals having second repetition frequencies, said second signals being offset by a programmable time relative to the first synchronization signal, said second signals being supplied to electronic so-called programmed delay signal outputs 143.
means 120 of generating a second external synchronization clock signal having a frequency identical to the first external clock signal, said signal being supplied to an electronic so-called clock output 141.
electronic interface means 31 with a microcomputer 3, said microcomputer making it possible to control and program all or part of the functions of the device.
electronic triggering means making it possible to synchronize certain functions of the device from at least one external signal, said signal being supplied to an electronic so-called "Trigger" input 144.
control means making it possible to deliver control signals for electronic devices or for electromechanical devices or for security systems, said signals being delivered to electronic control outputs 145.

Figure 2:
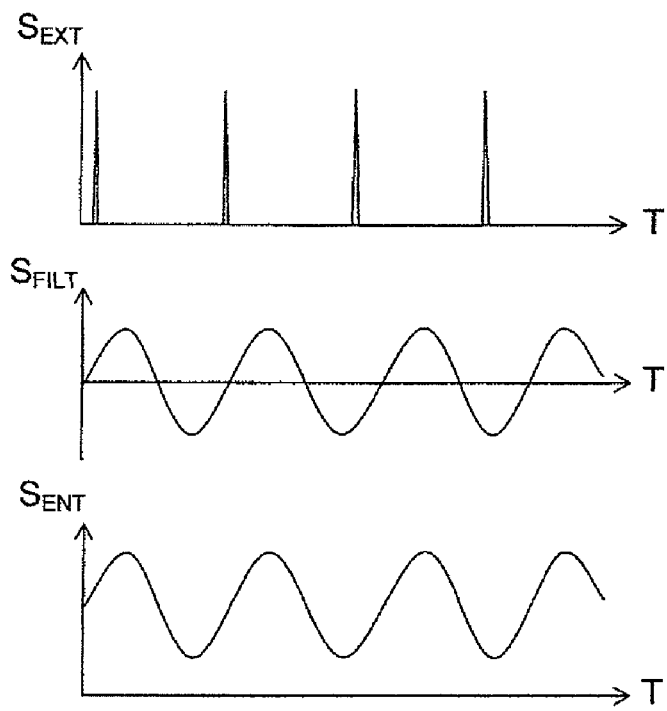
FIG. 2 represents the formatting of the external clock signal.

A certain number of instruments or electronic or optoelectronic systems, such as pulsed layers, deliver a very high stability clock signal. The principle of the invention is to use this clock signal to synchronize the various components of the device to be synchronized. To obtain a good clock signal, it is important for said signal to include only a single frequency, that is, for its amplitude variation according to time to be a perfect sinusoid. Now, the original external clock signal, which is, for example, a periodic pulsed signal, can include, outside its fundamental frequency corresponding to the periodicity of the signal, harmonic frequencies that are multiples of this fundamental frequency. In FIG. 1, this clock signal is supplied by the source 2. Consequently, the device according to the invention comprises first electronic means 110, 111 and 112 making it possible to obtain from an external clock signal $S_{EXT}$ a single-frequency filtered signal $S_{ENT}$. These means essentially comprise an electronic filter 110 and a variable gain amplifier 111 making it possible to obtain a sinusoidal filtered signal $S_{FILT}$ of known amplitude, the frequency of which is equal to the repetition frequency of the clock signal. The electronic adder device 112 makes it possible to add to the sinusoidal signal a DC component at least equal to half the amplitude of the sinusoidal signal so that the final signal $S_{ENT}$ is constantly positive. This last provision simplifies the subsequent processing by the second electronic means of generating synchronization signals. The three curves of FIG. 2 represent the successive forms of the signal according to the time T through the electronic formatting means. The first curve represents the external clock signal $S_{EXT}$, the second curve this same signal filtered $S_{FILT}$ and the final one the signal $S_{ENT}$ at the output of the electronic adder device 112.

Between the variable gain amplifier 111 and the adder device 112 there is placed an electronic coupler 120 making it possible to generate a second external synchronization clock signal having a frequency identical to the first external clock signal, said signal being supplied to an electronic so-called clock output 141.

The main function of the second electronic means is to generate from the preceding sinusoidal signal $S_{ENT}$ the synchronization signals $S_{SYNC}$. The core of these electronic means comprises a programmable digital component 130 which can be of FPGA (Fast Programmable Gate Array) type. This programmable digital component generates:

- a first periodic synchronization signal $S_0$ being used as a timebase reference, said signal having a first repetition frequency, said signal supplied to an electronic so-called reference output 142.
- a plurality of second periodic synchronization signals $S_{SYNC}$ having second repetition frequencies, said second signals being offset by a programmable time $\delta_M$ relative to the first synchronization signal $S_0$, said second signals being supplied to electronic so-called programmed delay signal outputs 143.

Figure 3:
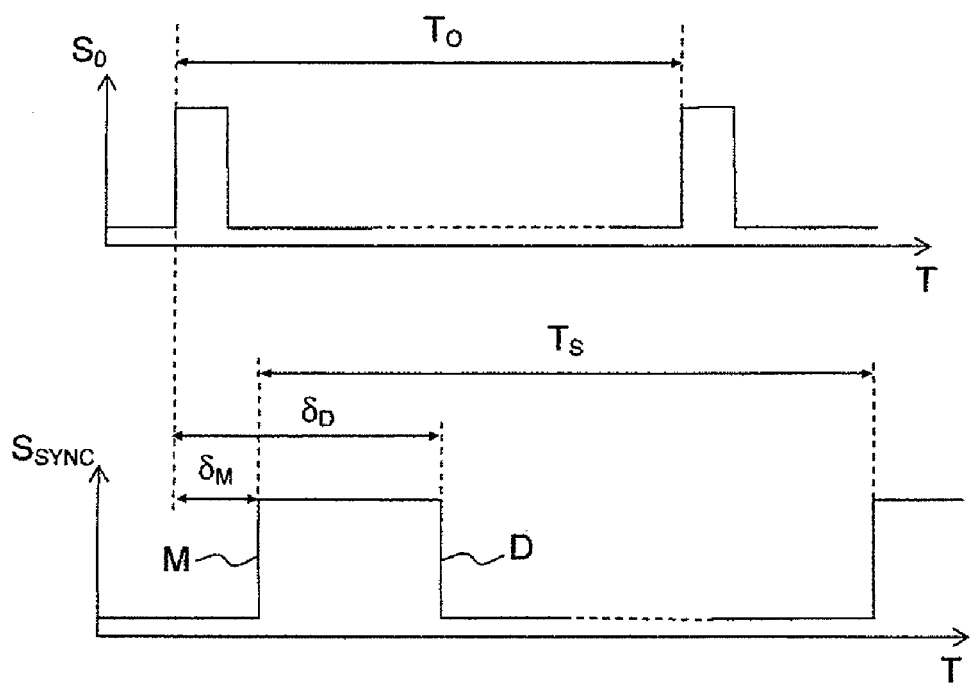
FIG. 3 represents the general form of the synchronization signals.

The form of the synchronization signals is illustrated in FIG. 3. The synchronization signals $S_0$ and $S_{SYNC}$ have the form of identical temporal pulse trains, each pulse having the form of a crenellation, the rising edge M and the falling edge D of said crenellation being offset by a first time $\delta_M$ and a second time $\delta_D$ that are programmable relative to the rising edge of the corresponding crenellation of the first synchronization signal $S_0$ taken as a reference. The times $T_O$ and $T_S$ separating the pulses of the synchronization signals $S_0$ and $S_{SYNC}$ are equal to the inverses of the repetition frequencies $f_O$ and $f_{SYNC}$ of the synchronization signals $S_0$ and $S_{SYNC}$. The repetition frequency $f_{SYNC}$ can be equal to or a submultiple of the repetition frequency $f_O$.

The programmable digital component 130 operates at the clock frequency and cannot deliver signals with a temporal resolution greater than the period of said clock frequency. Thus, if the clock frequency is 100 megahertz, the intrinsic resolution of the digital component is 10 nanoseconds. To obtain lower temporal resolutions, there are programmable delay lines 132 at the output of the programmable digital component 130, each of the second synchronization signals $S_{SYNC}$ being taken from the delay lines. There are thus obtained temporal accuracies of the rising edge and the falling edge of the crenellations far lower than the temporal period of the external clock. With the preceding example, it is possible to obtain temporal resolutions of the order of 250 picoseconds with a temporal uncertainty, also called "jitter", of the order of 50 picoseconds.

For reasons of user convenience and ergonomics, the various functions of the device can be monitored by a microcomputer 3 by means of electronic interfaces 31 represented symbolically by a double arrow in FIG. 1. These electronic interfaces 31 can be simple electronic links or be defined according to an electronic standard for exchanging data between electronic devices such as, for example, the RS232 standard. The control and monitoring software can be developed using specific software such as the measuring instrument monitoring software known by the brand name LABVIEW developed by National Instruments. It is advantageous, when the synchronization device is no longer being monitored by the microcomputer 3, for the programmed parameters, in particular the various delays governing the synchronization signals, to be retained so that the device can continue to operate independently outside the control of the microcomputer 3. For this purpose, the programmable digital component has an electronic memory 131.

Figure 4:
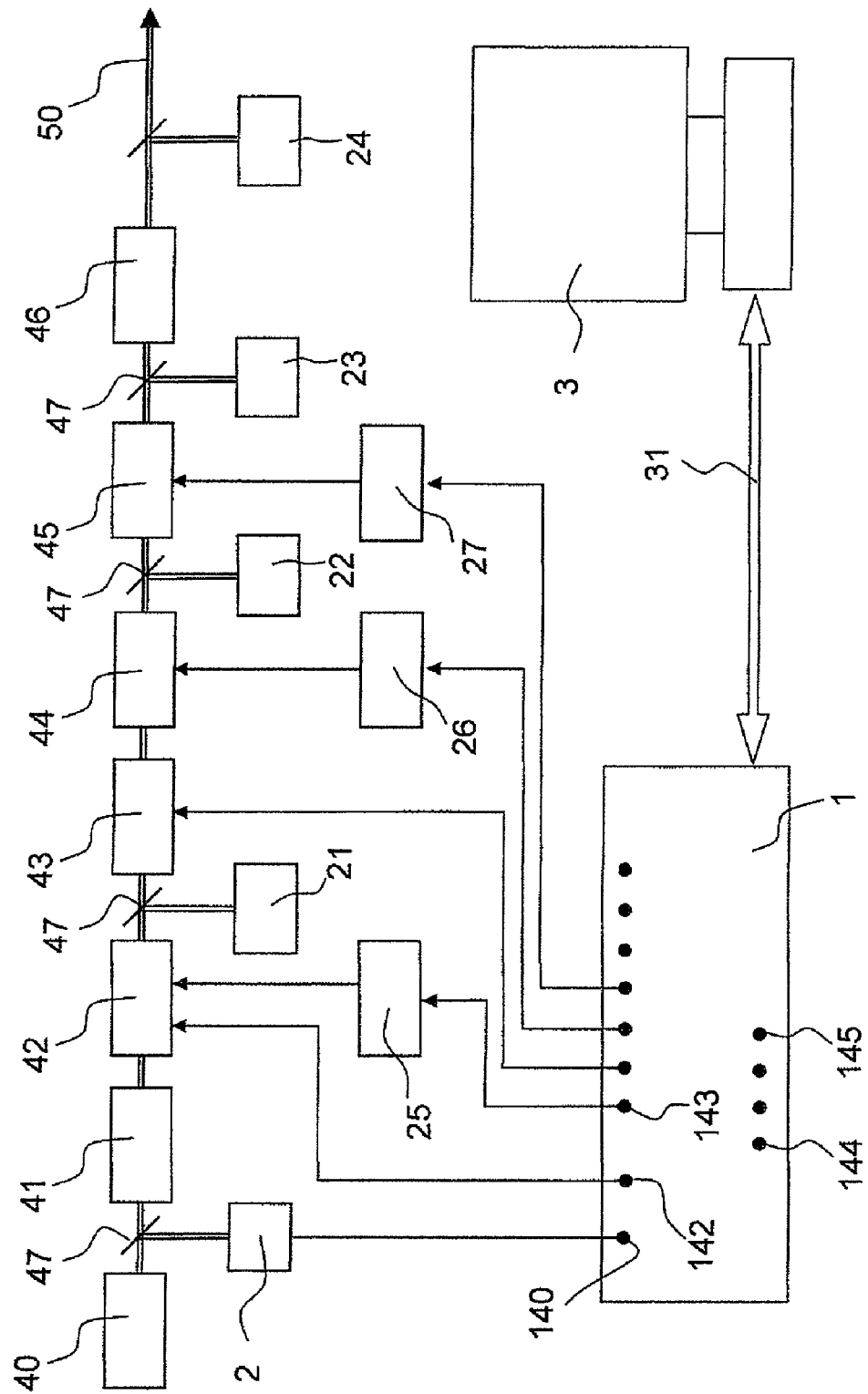
FIG. 4 represents a laser subsystem incorporating a device according to the invention.
Figure 5:
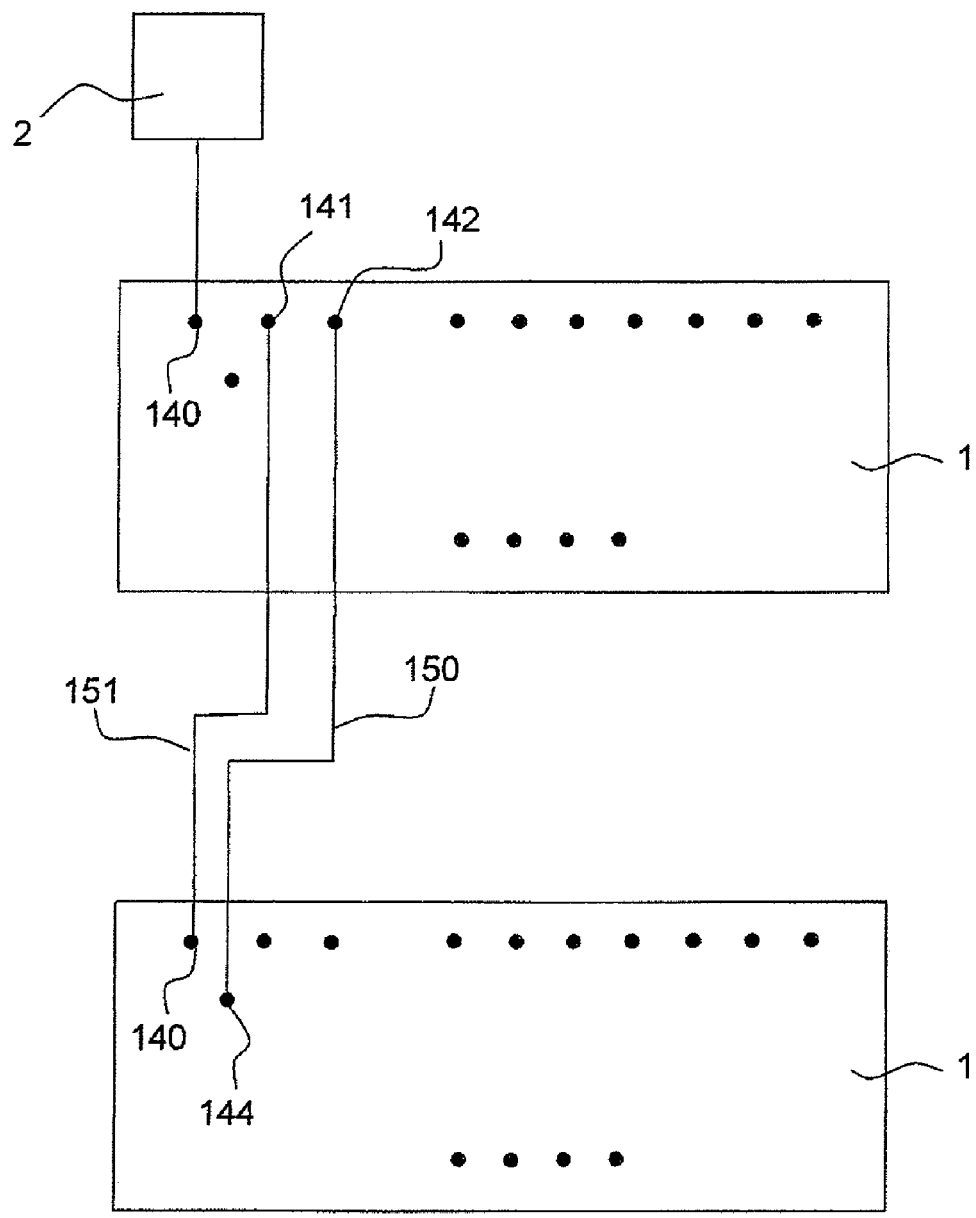
FIG. 5 represents a synchronization system according to the invention comprising two interlinked devices.

As an example, FIG. 4 illustrates a system comprising a synchronization device 1 according to the invention. The device requiring synchronization signals is a laser subsystem emitting ultra-brief pulses. The emitted laser beam 50 is symbolized in FIG. 4 by a double arrow. The subsystem comprises in turn:

- an optical oscillator 40 delivering laser pulse trains. Generally, the duration of the pulses is of the order of a few hundred femtoseconds and they are emitted at high repetition frequency, the order of magnitude of this first frequency is a few tens of megahertz. This repetition frequency is of a very high stability given the very low phase noise of the oscillator;
- a first optical device 41 with diffraction array, also called a "Stretcher" making it possible to temporally extend femtosecond pulses. The duration of the pulses is thus multiplied by a factor of between 1000 and 10 000. By thus extending the pulse, its peak power, which is considerable at the output of the subsystem, is correspondingly diminished. It can then be amplified greatly in complete safety for the various optical elements of the subsystem;
- a first so-called regeneration amplifier 42 making it possible to supply from the pulses taken from the "stretcher", pulses in a predetermined optical mode having a higher energy. These pulses are delivered at low repetition frequency, between 1 hertz and 500 kilohertz;
- a Pockels cell device 43 making it possible to limit the noise of the pulses by strictly limiting their temporal duration;
- a laser pulse preamplification 44 and amplification 45 assembly;
- finally, a second diffraction array device 46, also called "compressor", making it possible to temporally compress the pulse so as to return it to its original temporal duration and thus increase its peak power.

Evidently, depending on the requirements, this subsystem can contain other optical elements, it can have an amplification channel or several in parallel, etc.

In order to have geometrical, photometric and spectroscopic data and characteristics on the emitted pulses, samples are taken at various places on the laser subsystem. These samples are taken by means of semi-reflecting blades 47 placed along the optical beam 50 and the duly sampled light beams are sent, for example, to measurement photodiodes 2, 22 and 24, ultra-high speed cameras 21 and 23, also called "streak cameras", oscilloscopes, and so on. Thus, it is possible to send to the photodiode 2 a part of the laser pulse train taken from the optical oscillator 40. The electrical signal taken from said photodiode is then supplied to the clock input 140 of the synchronization device 1 according to the invention. From this signal, the synchronization device 1 delivers:

- a first periodic synchronization signal $S_0$ being used as a timebase reference, said signal having a repetition frequency equal to the low repetition frequency of the pulses. Said signal is supplied to an electronic so-called reference output 142 and controls the triggering of the first so-called regeneration amplifier 42 by means of a trigger device 25;
- a first plurality of second periodic synchronization signals $S_{SYNC}$, said second signals being offset by a programmable time relative to the first synchronization signal, said second signals being supplied to electronic so-called programmed delay signal outputs 143 and controlling the various optical elements of the subsystem by means of trigger devices 26 and 27.

The synchronization device 1 also delivers:
control signals which can be used to ensure either the protection of the elements of the subsystem in the event of malfunction of the oscillator, or the protection of users.

All the parameters of the synchronization device are managed by means of a microcomputer 3 via an interface 31 represented by a double arrow in FIG. 4.

The number of synchronization signals taken from one and the same device is necessarily limited. Now, certain systems, in particular certain pulsed laser subsystems, comprise a large number of elements needing to be synchronized with each other. In this case, the device according to the invention can be linked to other identical devices so as to form a synchronization system intended to synchronize all the elements of the subsystem. For the synchronization signals to be perfectly synchronized with each other, the following two conditions must be met:

the various synchronization devices must operate with the same internal clock;
the synchronization signals must be synchronized relative to a single timebase.

To achieve these two conditions, all that is required is to interlink two successive synchronization devices 1 according to the following arrangement:

the reference output 142 of the first device is linked to the electronic so-called "Trigger" input 144 of the second device by means of a first so-called "Trigger" link 150; and the clock output 141 of the first device being linked to the clock input 140 of the second device by means of a second so-called "Clock" link 151, each of the other devices being linked to the next device by two "Trigger" or "Clock" type links. The "Clock" and "Trigger" links introduce delays of a few nanoseconds per meter of electrical cable. These delays can easily be compensated in the programmable digital components of each synchronization device.

Evidently, the first device is linked to an external synchronization source 2.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. An electronic device for generating synchronization signals from a first external clock signal emitted at a first oscillation frequency, said signal being supplied to a so-called clock input, comprising:

a first electronic arrangement for formatting the external clock signal so as to obtain a sinusoidal signal of frequency identical to the first oscillation frequency;

a second electronic arrangement for generating from said sinusoidal signal:

a first periodic synchronization signal $S_0$ being used as a timebase reference, said signal having a first repetition frequency, said signal supplied to an electronic so-called reference output;

a plurality of second periodic synchronization signals $S_{SYNC}$ having second repetition frequencies, said second signals being offset by a programmable time relative to the first synchronization signal, said second signals being supplied to electronic so-called programmed delay signal outputs.

2. The electronic device for generating synchronization signals as claimed in claim 1, comprising: an arrangement for generating a second external synchronization clock signal having a frequency identical to the first external clock signal, said signal being supplied to an electronic so-called clock output.

3. The electronic device for generating synchronization signals as claimed in claim 1, wherein the second electronic arrangement includes a programmable digital component, in particular of FPGA type, said programmable digital component controlling a set of delay lines, each of the second synchronization signals $S_{SYNC}$ being taken from said delay lines.

4. The electronic device for generating synchronization signals as claimed in claim 3, wherein the first synchronization signal $S_0$ takes the form of a train of identical temporal pulses, each pulse having the form of a crenellation; the second synchronization signals $S_{SYNC}$ also take the form of trains of identical temporal pulses, each pulse having the form of a crenellation, the rising edge M and the falling edge D of said crenellation being offset by a first time $\delta_M$ and a second time $\delta_D$ programmable relative to the rising edge of the corresponding crenellation of the first synchronization signal $S_0$.

5. The electronic device for generating synchronization signals as claimed in claim 3, wherein the programmable digital component includes an electronic memory in which are stored the parameters needed for the electronic device to operate independently.

6. The electronic device for generating synchronization signals as claimed in claim 1, wherein the device comprises an electronic interface arrangement with a microcomputer, said microcomputer making it possible to control and program the functions of the device.

7. The electronic device for generating synchronization signals as claimed in claim 1, wherein the device comprises an electronic triggering arrangement making it possible to synchronize certain functions of the device from at least one external signal, said signal being supplied to an electronic Trigger input.

8. The electronic device for generating synchronization signals as claimed in claim 1, wherein the device comprises control arrangement making it possible to deliver control signals for electronic devices or for electromechanical devices or for security systems, said signals being delivered to electronic control outputs.

9. The electronic device for generating synchronization signals as claimed in claim 1, wherein the first electronic arrangement include an electronic filtering device and a variable gain device.

10. The electronic device for generating synchronization signals as claimed in claim 2, wherein the arrangement which generates the second external synchronization clock signal is essentially an electronic coupler placed at the output of the variable gain device.

11. The electronic device for generating synchronization signals as claimed in any one of the preceding claims, wherein the first oscillation frequency is between 20 megahertz and 100 megahertz.

12. The electronic device for generating synchronization signals as claimed in any one of the preceding claims, wherein the repetition frequency is between 1 hertz and 20 megahertz.

13. The electronic device for generating synchronization signals as claimed in claim 4, wherein the rising edge M and falling edge D of the crenellations have a temporal accuracy of 250 picoseconds.

14. An electronic system for generating synchronization signals from a first external clock signal emitted at a first oscillation frequency, comprising a first and a second electronic device according to claim 2, the first device being controlled from a first external clock signal, the reference output of the first device being linked to the electronic Trigger input of the second device by a first Trigger link and the clock output of the first device being linked to the clock input of the second device by a second Clock link, each of the other devices being linked to the following device by two links of Trigger or Clock link type.

15. The electronic device for generating synchronization signals as claimed in claim 8, wherein the arrangement for generating the second external synchronization clock signal comprise an electronic coupler placed at the output of the variable gain device.

16. The electronic device for generating synchronization signals as claimed in claim 14, wherein the device comprises an electronic triggering arrangement making it possible to synchronize certain functions of the device from at least one external signal, said signal being supplied to an electronic Trigger input.

17. A laser subsystem having the following optoelectronic elements:
- a local oscillator emitting an optical beam in the form of laser pulse trains;
- an energy amplification subsystem;
- a device which spatially and temporally formats the optical beam;
- and a control, monitoring and measurement arrangement, and wherein said subsystem comprises:
- a semi-reflecting optical splitter placed at the output of the local oscillator;
- a photodiode placed on one of the channels of said splitter so as to receive a part of the optical beam, said photodiode delivering an electrical signal representative of said optical beam; and
- a device as claimed in claim 1 the electrical signal taken from the photodiode being used as a clock signal for said device or said system, the synchronization signals $S_{SYNC}$ taken from said device or from said system being used to synchronize the various optoelectronic elements of the subsystem.

18. A laser subsystem comprising:
- a local oscillator emitting an optical beam in the form of laser pulse trains;
- an energy amplification subsystem;
- an arrangement which spatially and temporally formats the optical beam;
- a control monitoring and measurement arrangement;
- a semi-reflecting optical splitter placed at the output of the local oscillator;
- a photodiode placed on one of the channels of said splitter so as to receive a part of the optical beam, said photodiode delivering an electrical signal representative of said optical beam; and
- a device as claimed in claim 1, wherein the electrical signal taken from the photodiode is used as a clock signal for said device or said system, the synchronization signals $S_{SYNC}$ taken from said device or from said system being used to synchronize the various optoelectronic elements of the subsystem.

* * * * *